United States Patent Office 2,888,340
Patented May 26, 1959

---

2,888,340

FUEL OIL COMPOSITIONS

Charles N. Winnick, Wilmington, Del., assignor to E. I. du Pont de Nemours and Company, Wilmington, Del., a corporation of Delaware No Drawing. Application April 8, 1957
Serial No. 651,141

6 Claims. (Cl. 52—.5)

This invention is directed to hydrocarbon distillate fuels, and more particularly, to stabilized hydrocarbon distillate fuel oils adapted to withstand the prolonged oxidizing conditions of storage without deterioration and at the same time to have a much reduced tendency to form emulsions with water.

U.S. Patent 2,737,452 describes improved stabilized fuel oil compositions obtained by incorporating certain oil-soluble, basic amino nitrogen-containing addition type polymers into the oil. Incorporation of these polymers into fuel oils, for example, not only stabilizes fresh fuel oils against the formation of sludge and sediment but also suspends and disperses the sludge and sediment present in aged oils in such a way as to be relatively harmless and also retards discoloration of the oils and reduces their corrosiveness toward metals.

It has been found, however, that even the small amounts of these polymers present in the fuel have the undesirable effect of causing the emulsification in the oil of small amounts of water which may be in contact with the oil. This presence of water may come about, for example, by the seepage of water into underground tanks, by rain falling into improperly protected tanks, by condensation of moist air, by the incomplete removal of water used as ballast in empty tankers, and by incomplete removal of water after earlier steps in the refining of the fuel. The emulsification of even small quantities of water in these hydrocarbon fuels, when it occurs, may make the oil unsuitable for many uses.

U.S. Patent No. 2,805,925 employs a mono fatty acid amide of an ethylene or propylene polyamine, such as the diethylene triamine monooleamide or dimethylaminopropyl oleamide, as the demulsifier for the improved fuel oil compositions.

In the present invention, certain petroleum hydrocarbon sulfonamides are employed, these have been found to be highly effective in a wide variety of distillate hydrocarbon fuels at low concentrations.

An object of this invention is to provide a new and improved stabilized distillate hydrocarbon fuel. A further object is to provide a stabilized fuel having a much reduced tendency to form emulsions with water. A still further object is to provide a composition which, when added to a distillate hydrocarbon fuel, stabilizes and reduces the emulsification tendencies of the fuel.

These and other objects will become apparent in the following description and claims.

More specifically, the present invention is directed to a distillate hydrocarbon fuel containing (1) as a sludge inhibiting and dispersing agent at least 0.001% by weight of an oil-soluble, basic amino nitrogen-containing addition type copolymer containing in combined form as its essential monomeric components copolymerizable ethylenically unsaturated compounds each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., and, (2) at least about 0.0001% of a demulsifier consisting essentially of an N-(diloweralkylaminoalkyl) hydrocarbon sulfonamide produced on reaction of a chlorosulfonated petroleum hydrocarbon wax with a diloweralkylaminoalkylamine in which the tertiary and primary amine groups are separated by at least 2 carbon atoms.

The polymeric dispersants may be defined as oil-soluble, basic amino nitrogen-containing addition type copolymers containing in their combined form as essential monomeric components, copolymerizable ethylenically unsaturated compounds each containing only one polymerizable ethylenic linkage, at least one of which component is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C.

Any of the "basic amino nitrogen-containing polymers" described and prepared in U.S. Patent 2,737,452 may be employed in the present invention. Representative polymeric dispersants are: The 50/40/10 tripolymer of octadecenyl methacrylate, styrene and beta-diethylaminoethyl methacrylate; the 50/40/10 tripolymer of lauryl methacrylate, styrene and N-(3-dimethylaminopropyl) methacrylamide; the 80/20 copolymer of lauryl methacrylate and beta-diethylaminoethyl methacrylate; the 90/10 copolymer of octadecenyl methacrylate and diethylaminoethyl methacrylate; the 77/23 copolymer of lauryl methacrylate and beta-dibutylaminoethyl methacrylate; the 90/10 copolymer of cetyl methacrylate and 4-vinylpyridine; the 80/20 copolymer of lauryl methacrylate and 4-vinylpyridine; the 92.5/7.5 copolymer of lauryl methacrylate and diethylaminoethyl methacrylate; the 90/10 copolymer of lauryl methacrylate and N-(3-dimethylaminopropyl) methacrylamide; the 80/20 copolymer of vinyl lauryl ether and vinyl diethylaminoethyl ether; and, the 92.5/7.5 copolymer of vinyl laurate and diethylaminoethyl methacrylate. The quantities expressing the composition of these polymers are in parts by weight.

Representative hydrocarbon fuels which may be used according to the present invention are: Jet fuel (e.g. JP–4 and JP–5 jet fuel), kerosene, diesel oil, and fuel oil (e.g. #2 burner oil).

The demulsifiers of the present invention are prepared by reacting a chlorosulfonated petroleum wax with a diloweralkylaminoalkylamine to produce compositions which are essentially substituted sulfonamides as defined.

The petroleum hydrocarbons which are starting materials for the preparation of the subject sulfonamides are mixtures of hydrocarbons whose chief constituents are the hydrocarbons of the petroleum fractions broadly known as the petroleum waxes. They consist predominantly of petroleum hydrocarbon fractions containing at least 16 carbon atoms and boiling above about 375–390° C., and vary in appearance from viscous oils, through oily solids and jellies, to solids. They include higher boiling gas oil fractions, wax distillates, petrolatum, the hard and soft paraffin waxes and the microcrystalline waxes. Preferably they will be the mixtures known as petrolatum and the paraffin waxes, and mixtures thereof. The term petroleum waxes is generic to the petrolatums, the paraffin waxes and the microcrystalline waxes, all three generally being made by processes involving solvent dewaxing or pressing and sweating. Petrolatum (mineral fat or petroleum jelly) is an oily, gelatinous, semi-solid, amorphous mass which usually becomes fluid at temperatures between about 35–60° C. Its chief constituents are saturated hydrocarbons containing from about 16 to about 32 carbon atoms. Both natural and "artificial" petrolatum may be employed. (Artificial petrolatums are generally blends of a heavy petroleum lubricating oil with a low melting paraffin wax.) The paraffin waxes (known as paraffin, paraffin scale, ceresin wax, melting generally within the range 35–60° C.) may be the soft or hard grades. Preferably they will be low melting waxes or low melting mixtures of paraffin waxes and/or the higher melting microcrystalline waxes with petrolatum. Mixtures melting below about 70° C. are preferred. There may be obtained from the higher melting hydrocarbon waxes by blending them with the oily and low melting products, e. g., the petrolatums, in the necessary proportions.

Specific chlorosulfonated petroleum hydrocarbons which are applicable to the present invention are described and prepared in U.S. Patent 2,334,764. The general method of reacting petroleum hydrocarbons with $SO_2$ and $Cl_2$ is described in U.S. Patent 2,046,090; U.S. Patent 2,202,791 and in U.S. Patent 2,334,186.

The chlorosulfonated petroleum hydrocarbons are prepared by treating these high molecular weight hydrocarbon compounds in the fluid state with sulfur dioxide and chlorine, in the presence of actinic radiation or a free radical generator until the starting hydrocarbon compounds are at least in part converted into chlorosulfonyl derivatives. The products thus obtained consist essentially of a complex mixture of mono- and poly-sulfonyl-chlorides and, depending upon the quantities of $SO_2$ and $Cl_2$ employed, mono- and poly-chlorosulfonylchlorides, unreacted hydrocarbons and chlorinated hydrocarbons.

The chlorosulfonation process proceeds best in presence of excess $SO_2$. The mole ratios of $SO_2$ to $Cl_2$ will generally range from about 1.1 to 1 to about 3 to 1 although 6 to 1 and as high as 20 to 1 may be used. Mole ratios of about 1.5 to about 2.5 to 1 are preferred. The temperature of the reaction mass should be sufficiently high so that the reaction mass remains fluid throughout the chlorosulfonation. Temperatures 5 to 25° C. above the melting range of the starting material are satisfactory and will generally not exceed 100° C. (to avoid side reactions) and preferably will be at about 70° C. or below. Thus the starting mixture of hydrocarbons will have a melting point of less than 95° C., preferably less than 70° C.

The source of actinic radiation may be an incandescent lamp, a mercury vapor lamp, or any comparable source as described in the above cited patents. Alternately, a free radical generator such as azoisobutyronitrile may be employed to initiate the chlorosulfonation reaction, as is well known in the art (see U.S.P. 2,503,279; U.S.P. 2,503,-280 and U.S.P. 2,503,253).

The reaction is conveniently followed by determining the increase in weight or in specific gravity of the reaction mixture. For reasons of economy it is preferred to convert at least about 10% of the hydrocarbons to the corresponding sulfonyl chloride derivatives. The conversion may be as high as 70% but is much preferably below about 50% to minimize formation of poly-sulfonyl chloride derivatives.

When the desired degree of chlorosulfonation is attained, the reaction mass is blown with dry nitrogen, carbon dioxide or other inert gas to yield a product substantially free of dissolved $SO_2$, $Cl_2$ and HCl, the last traces of which may be completely removed at reduced pressures if desired. Under the described conditions, hydrocarbons containing only one chlorosulfonyl group predominate among the products formed (Equation 1). Direct chlorination (Equation 2) and to some extent polychlorosulfonation are competing reactions. When processes 1 and 2 both take place (at different points) in the same molecule the product is a chlorohydrocarbon sulfonyl chloride.

$$\equiv C-H + SO_2 + Cl_2 \rightarrow \,\equiv C-SO_2Cl + HCl \quad (1)$$

$$\equiv C-H + Cl_2 \rightarrow \,\equiv C-Cl + HCl \quad (2)$$

The preferred chlorosulfonated products are those in which the mono chlorosulfonated derivatives predominate. These will generally contain from about 4 to 10% sulfur and from about 6 to 14% chlorine. The excess chlorine content (i.e. as produced through Equation 2, the chain chlorination process) is relatively unimportant. The preferred chlorosulfonated petroleum wax is that obtained from a mixture of paraffin wax and petrolatum and contains about 7% S and about 10% Cl (see example 1).

The aliphatic diamines which may be employed are represented by the following formula

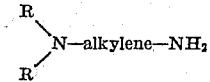

where the two R groups may be the same or different lower alkyl groups, i.e., 1 to 4 carbon atoms, and the alkylene radical contains at least 2 carbon atoms. Representative compounds are: 3-dimethylaminopropylamine, 3-diethylaminopropylamine, 2-diethylaminoethylamine, 5-dimethylaminoamylamine and 6-dimethylaminohexylamine.

The demulsifiers of the present invention are obtained by allowing the sulfochlorinated hydrocarbons to react with the diamine, preferably and conveniently in an inert solvent at ordinary temperatures. The principal reaction involved is believed to be that represented by Equation 3.

$$\sim SO_2Cl + NH_2-\text{alkylene}-NRR \rightarrow$$
$$\sim SO_2-NH-\text{alkylene}-NRR \cdot HCl \quad (3)$$

Since hydrogen chloride is a product of the reaction, presence of an added acid-binding agent in the reaction mixture is desirable but is not essential since the reaction product itself, in having a free tertiary amino group (which does not condense with the $-SO_2Cl$ group under the conditions employed), can bind the HCl. The hydrochloride of the reaction product is then treated with an alkaline-reacting material such as caustic or metal carbonate to generate the desired form of the product. It is desirable, to ensure complete utilization of the $-SO_2Cl$ groups, to employ at least a slight excess of the diamine reactant. A larger excess may be employed, for example, an excess which is at least sufficient to convert all of the HCl (i.e., the stoichiometric quantity of reaction 3) to the corresponding amine hydrochloride. The hydrochloride salt of the diamine is often insoluble in the reaction media and when it is, it is thus easily recoverable and subsequently reconvertible to the free diamine which can be reused. Alternately, substantially a stoichiometric quanity of the diamine may be employed admixed with at least a sufficient quantity of an otherwise inert tertiary amine as an acid binder, such as triethyl amine, pyridine or the like. The particular method of removing the HCl from the reaction product is not critical, as described above, this may be done during or after the reaction of the diamine reactant with the chlorosulfonated petroleum wax. Neither are the general features of the reaction itself critical, the formation of sulfonamides being old art. The critical features are those of the chlorosulfonated petroleum wax reactant and of the diamine reactant, as discussed and defined above.

Suitable solvents for the process (Equation 3) are the liquid hydrocarbons and halogenated hydrocarbons, e.g., cyclohexane, toluene, chlorobenzene, and the like, and the oxa-derivatives such as ethyl ether, butyl ether, tetrahydrofuran, dioxane, and the like. The crude product is recovered from the organic solvent by evaporation usually under reduced pressure. This product as such may be used as the demulsifier. Preferably, however, before the sulfonamido-derivative is recovered its solution in the organic solvent is washed with dilute aqueous caustic, then dried. At this stage the product still contains unreacted (and harmless) hydrocarbon constituents. If desired, these diluents may be removed (to obtain a more active ingredient on a weight basis) by partitioning the impure product between a polar and non-polar solvent. The fraction obtained from the polar solvent is the active ingredient. A suitable pair of immiscible solvents for this use is methanol and cyclohexane. The thus purified demulsifier is recovered from the methanol layer by distilling off the solvent.

The subject products are believed to consist essentially of N-diloweralkylaminoalkyl-sulfonamides (Equation 3). Because chlorine is generally also present in the chlorosulfonated hydrocarbon mixture as chlorine directly bonded to carbon (Equation 2), alkylation of the amine may also occur to some extent. These products of the direct alkylation reaction are believed to be very minor components of the product mixture. Also, since these chloro groups are most likely attached to secondary and tertiary carbon atoms, elimination of HCl with formation of an olefinic bond is a likely occurrence under the conditions of forming the substituted sulfonamides. The subject sulfonamide derivatives are excellent demulsifiers in the defined fuel-polymeric dispersant systems. The distillate hydrocarbon fuels such as the jet fuels, Diesel fuels, burner fuels, intermediate fractions, and blends thereof, including straight run stocks, catalytic cracked stocks and blends thereof, which have been treated to contain the polymeric dispersant of U.S.P. 2,737,452, differ widely in the ease with which their emulsions with water may be broken. The stability of the emulsions is a function of both the particular fuel and the particular dispersant (emulsifying agent in this case).

The concentration of the stabilizing polymer in the fuel will vary to some extent depending on the effectiveness of the particular polymer, the initial stability of the oil and the degree of stability required. Generally, concentrations between about 0.001 and 0.1% and particularly between 0.002 and 0.01% will be used. Occasionally, however, as little as 0.0005% will provide the desired degree of stabilization. The subject demulsifiers are effective at concentrations as low as 0.0001% based on the weight of the fuel; the actual minimum quantity needed for any particular combination of fuel and polymeric dispersant may vary with the nature of the fuel, the dispersant and its concentration; normally, from 0.0005 to 0.05% demulsifier will be employed, the lower concentrations with the lower concentrations of dispersant.

Representative examples illustrating the present invention follow.

EXAMPLE 1

*Preparation of sulfonamide from chlorosulfonated paraffin wax and petrolatum and 3-dimethylaminopropylamine*

A mixture of 2160 parts of paraffin wax (M.P. 120–124° F.) and 375 parts of petrolatum (petroleum jelly) was chlorosulfonated by the method of U.S. Patent 2,334,764.

The crude product was degassed by heating at 70° C. for one hour at a pressure of 20 mm. Hg. The degassed product contained 7.0% sulfur and 10.2% chlorine.

A solution of 100 g. of the sulfonyl chloride in 100 ml. of dry ethyl ether was added slowly to a solution of 40 g. of 3-dimethylaminopropylamine in 100 ml. of dry ether with agitation. A heavy precipitate formed and 50 ml. of dry ether was added to the reaction mass which was heated at reflux for one hour, cooled and filtered. The filter cake was washed with ethyl ether, the washings being added to the filtrate. The ether solution was washed with 100 ml. of 2% aqueous sodium hydroxide, dried over anhydrous sodium sulfate, filtered and evaporated in vacuum to yield the crude demulsifying agent.

The residue was further purified by dissolving it in 300 ml. of methanol and extracting with 500 ml. of cyclohexane at 5° C. The extraction was repeated with 250 ml. of cyclohexane, and the methanol solution was distilled at reduced pressure to yield 34.5 g. of a dark oil as the active ingredient.

EXAMPLE 2

The procedure of Example 1 was repeated on a half scale. The sulfonyl chloride (50 g.) was the same but the diamine was 2-diethylaminoethylamine (25 g.). The product was a dark oil weighing 20.3 g.

EXAMPLE 3

The procedures of Example 1 were repeated except that the diamine was 3-diethylaminopropylamine (51 g.) and the ether solution was extracted with two 200 ml. portions of 2% NaOH solution. The product, a dark oil, weighed 40 g.

EXAMPLE 4

Example 1 was repeated on a ⅕ scale, using 5-dimethylaminoamylamine (10 g.) and the sulfonylchloride (20 g.) of Example 1. 49 g. of a dark oil was obtained.

EXAMPLE 5

A mixture consisting of 595 parts of #50 white oil, 1780 parts of paraffin wax (M.P. 100–110° F.) and 465 parts of petrolatum was chlorosulfonated by the procedure of U.S. Patent 2,334,764. The degassed crude chlorosulfonate contained 4.2% sulfur and 9.1% chlorine. A demulsifier composition was prepared from the above chlorosulfonated mixture of petroleum hydrocarbons and 3-dimethylaminopropylamine according to the procedures described in Example 1.

EXAMPLE 6

The procedures of Example 1 were applied to #30 white oil; the chlorosulfonated #30 white oil contained 6.5% sulfur and 11.6% chlorine. It was converted to a demulsifier composition on reaction with 3-dimethylpropylamine, as described above.

The following may be utilized as operable starting materials: The chlorosulfonated hydrocarbon mixtures described in Examples II, III, IV, V and VI of U.S. Patent 2,334,764.

*Emulsion tests*

To illustrate the effectiveness of the subject demulsifiers, portions of untreated and treated distillate hydrocarbon fuels were subjected to an emulsification test which severely simulates conditions pertaining when fuel is run into and withdrawn from a tank containing water. The test consists of agitating 190 ml. of fuel sample plus 10 ml. of water in a 400 ml. tall form beaker. The fuel-water mixture is mixed with a Hamilton Beach #33 mixer at high speed for 5 minutes and allowed to stand overnight. The number of milliliters of free water is visually estimated. A rating of 10 means the oil and water phases separated completely. A rating of zero means that all the water is emulsified with the oil. Intermediate values represent the quantity of water present as a separate phase, the remainder being emulsified with the oil.

EXAMPLE 7

The demulsifiers prepared in Examples 1 to 4 (designated as E1 to E4 below) were evaluated in three different #2 fuel oil-polymeric dispersant systems. Fuel B was a 100% straight run stock; C, 100% catalytic cracked; A, a 50/50 blend of Fuels B and C. The polymeric dispersant was a 50/40/10 tripolymer of octadecenyl methacrylate, styrene and beta-diethylaminoethyl methacrylate, designed as Polymer X in the table below, and present in quantity corresponding to 0.005% by weight based on the fuel. The concentration of demulsifying agent in the treated samples was 0.001% by weight of the fuel. The results of the above-described emulsification test are tabulated below:

| Test | Additive | Rating (ml. of free (H₂O) in | | |
|---|---|---|---|---|
| | | Fuel A | Fuel B | Fuel C |
| 1 | None | 10 | 10 | 10 |
| 2 | Polymer (0.005%) alone (X) | 0 | 0 | 0 |
| 3 | Polymer + E1(0.001%) (X) | 10 | 10 | 10 |
| 4 | Polymer + E2 (X) | 10 | 10 | 10 |
| 5 | Polymer + E3 (X) | 10 | 10 | 10 |
| 6 | Polymer + E4 (X) | 10 | 10 | 10 |

Tests 1 and 2 are the controls. Tests 3 to 6 illustrate the effectiveness of the subject products.

Substantially identical results were obtained when the above series of tests were repeated in the same fuels A, B and C and with demulsifiers E1 and E4 inclusive, but with a different polymeric dispersant (Y), namely, the 90/10 copolymer of octadecenyl methacrylate and beta-diethylaminoethyl methacrylate. Again demulsifiers E1, E2 and E3 and E4 were completely effective in these fuels.

The additives of the present invention (0.001% by weight of the fuel) are also completely effective in 100% catalytic cracked #2 fuel oil containing any of the following polymers (0.0005%): Polymer B (92.5/7.5 vinyl laurate/diethylaminoethylmethacrylate); Polymer Z (50/40/10 lauryl methacrylate/styrene/N-(3-dimethylaminopropyl)methacrylamide), and Polymer A (90/10 cetyl methacrylate/4-vinylpyridine).

EXAMPLE 8

The tests of Example 7 were repeated except that the concentration of the polymeric dispersant (either Polymer X or Polymer Y of Example 7) was only 0.0005% by weight, that of the demulsifier 0.0001%. Four different fuels were employed: #2 Fuel oils A and B of Example 7, JP-4 jet fuel (Fuel C) and JP-5 jet fuel (Fuel D). The test results are given below:

| Test | Additive | Rating (ml. of Free H₂O) in Fuels | | | |
|---|---|---|---|---|---|
| | | A | B | C | D |
| 7 | None | 10 | 10 | 10 | 10 |
| 8 | Polymer alone | 0 | 0 | 0 | 0 |
| 9 | Polymer+E1 | 10 | 10 | 10 | 10 |
| 10 | Polymer+E2 | 10 | 10 | 10 | 10 |
| 11 | Polymer+E3 | 10 | 10 | 10 | 10 |
| 12 | Polymer+E4 | 10 | 10 | 10 | 10 |

Note that the fuel is readily emulsified with the water even at the relatively low concentrations of dispersant employed (1/10 that of Example 7).

The following series of identical tests in a 100% catalytic cracked fuel with Polymer Y of Example 7 (50/40/10 tripolymer of octadecenyl methacrylate, styrene and beta-diethylaminoethyl methacrylate) further illustrates the present invention:

| Test | Additive | Rating (ml. free H₂O) in 100% Catalytic Cracked Fuel |
|---|---|---|
| 13 | Polymer Y of Ex. 7 | 0 |
| 14 | Polymer Y+E1 | 10 |
| 15 | Polymer Y+E2 | 5 |
| 16 | Polymer Y+E3 | 10 |
| 17 | Polymer Y+E4 | 10 |

The effectiveness of these additives, at concentrations as low as 0.0001%, in breaking emulsions promoted by other typical polymeric dispersants is illustrated below wherein the polymer and demulsifier concentrations are 0.0005% and 0.0001%, respectively.

| Test | Additive | Rating (ml. Free H₂O) in JP-5 jet fuel |
|---|---|---|
| 18, 19 | Polymer Z (or A) | 0 (0) |
| 20, 21 | Polymer Z (or A)+E1 | 9 (10) |
| 22, 23 | Polymer Z (or A)+E2 | 8 (10) |
| 24, 25 | Polymer Z (or A)+E3 | 9 (10) |
| 26, 27 | Polymer Z (or A)+E4 | 10 (10) |

The bracketed results are those obtained when Polymer A replaces Polymer Z. In this emulsion test, Polymer Z=50/40/10 tripolymer of lauryl methacrylate, styrene and N-(3-dimethylaminopropyl) methacrylamide and Polymer A=90/10 copolymer of cetyl methacrylate and 4-vinylpyridine.

Excellent results with 0.0002% demulsifiers E1, E2, E3 or E4 are also obtained in a diesel oil-0.0005% Polymer Z system.

The compositions described in Examples 5 and 6 also show demulsifying properties. They are particularly effective in light hydrocarbon fuels such as the jet and diesel fuels; however, they are less broadly applicable to relatively heavy hydrocarbon fuels such as the burner oils than are the demulsifiers of Examples 1–4.

When the demulsifier of Example 5 was evaluated in a 100% catalytically cracked fuel, at a concentration of 0.001% by weight of the fuel and in the presence of 0.005% by weight based on the fuel of the 50/40/10 tripolymer of octadecenyl methacrylate, styrene and beta-diethylaminoethyl methacrylate as polymeric dispersant, according to the emulsion test outlined prior to Example 7, a rating of 9.5 milliliters of free water in the fuel was obtained thus indicating a substantially complete separation of the water and oil phases. Substantially the same result was achieved when the 90/10 copolymer of octadecenyl methacrylate and beta-diethyl-aminoethyl methacrylate was utilized as polymeric dispersant.

When the demulsifier of Example 5 is utilized at a concentration of 0.0001% by weight of the fuel in the presence of 0.0005% by weight of the fuel of polymeric dispersant, the dispersants utilized being (1) the tripolymer, 50/40/10 of octadecenyl methacrylate, styrene and beta-diethylaminoethyl methacrylate or (2) a 90/10 copolymer of octadecenyl methacrylate and beta-diethylaminoethyl methacrylate, an emulsion rating of 9 is determined in a JP-4 jet fuel and an emulsion rating of 10 in a JP-5 jet fuel for both systems.

When the demulsifier of Example 6 was evaluated in a 100% catalytically cracked fuel, at a concentration of 0.001% by weight of the fuel and in the presence of 0.005% by weight based on the fuel of the 50/40/10 tripolymer of octadecenyl methacrylate, styrene and beta-diethylaminoethyl methacrylate as polymeric dispersant, according to the emulsion test outlined prior to Example 7, a rating of 10 milliliters of free water in the fuel was obtained thus indicating a substantially complete separation of the water and oil phases. Substantially the same result was achieved when the 90/10 copolymer of octadecenyl methacrylate and beta-diethyl-aminoethyl methacrylate was utilized as polymeric dispersant.

When the demulsifier of Example 6 is utilized at a concentration of 0.0001% by weight of the fuel in the presence of 0.0005% by weight of the fuel of polymeric dispersant, the dispersants utilized being (1) the tripolymer, 50/40/10 of octadecenyl methacrylate, styrene and beta-diethylaminoethyl methacrylate or (2) a 90/10 copolymer of octadecenyl methacrylate and beta-diethylaminoethyl methacrylate, an emulsion rating of 9 is determined in both JP-4 and JP-5 jet fuels for each system.

While the invention has been illustrated by means of adding the additives to the subject fuels, it is understood that a concentrated solution containing both demulsifier and polymeric dispersant may be added to the fuel. Thus the fuel may be treated with a suitable small amount of a single liquid which is a solution of the combined additives in a carrier such as kerosene, fuel oil and the like. The ratio of polymeric dispersant to demulsifier will be dependent on fuel type and polymeric dispersant employed. The ratio of polymeric dispersant to demulsifier will preferably be about 5 to 1, but higher ratios such as 10 to 1 may also be employed. A typical concentrate consists of the demulsifier of Example 1, the 50:40:10 tripolymer of octadecenyl methacrylate, styrene and beta-diethylaminoethyl methacrylate, and kerosene, in the weight ratio of 1:5:5. The 5 parts of kerosene of this concentrate may be replaced by other suitable solvents such as for example 5 parts of a mixture of xylene and kerosene in approx. a 3 to 1 ratio. Another typical concentrate consists of the demulsifier of Example 1 (1 part), the 90:10 copolymer of octadecenyl methacrylate and beta-diethylaminoethyl methacrylate (5 parts) and solvent neutral oil #150, a bright stock blending base for lubricating oil (7.5 parts). Also, instead of the solvent neutral oil, xylene or its mixtures with the solvent neutral oil may be employed, e.g., 7.5 parts of solvent neutral oil plus 10 parts of xylene.

The embodiments of the invention in which an exclusive property or privilege is claimed are defined as follows:

1. A distillate hydrocarbon fuel taken from the group consisting of fuel oils and jet fuels containing (1) as a sludge inhibiting and dispersing agent from about 0.001 to 0.1% by weight of an oil-soluble, basic amino nitrogen-containing addition type copolymer containing in combined form as its essential monomeric components copolymerizable ethylenically unsaturated compounds each containing only one polymerizable ethylenic linkage, at least one of which component is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., and, (2) a stabilizing quantity within the range of from about 0.0001% to 0.05% by weight of said fuel of a demulsifier consisting essentially of an N-(diloweralkylaminoalkyl) hydrocarbon sulfonamide produced on reaction of a chlorosulfonated petroleum hydrocarbon wax with a diloweralkylaminoalkylamine in which the tertiary and primary amine groups are separated by at least 2 carbon atoms.

2. A distillate hydrocarbon fuel taken from the group consisting of fuel oils and jet fuels containing (1) as a sludge inhibiting and dispersing agent from about 0.001 to 0.1% by weight of an oil-soluble, basic amino nitrogen-containing addition type copolymer containing in combined form as its essential monomeric components copolymerizable ethylenically unsaturated compounds, one of which is from the group consisting of acrylic and alkacrylic esters of aliphatic alcohols of from 8 to about 18 carbon atoms and one of the components is from the group consisting of alkyl and cycloalkyl substituted tertiary aminoalkyl and amino cycloalkyl esters of acrylic and alkacrylic acids, said copolymer containing 0.1% to 3.5% by weight of basic amino nitrogen and said polymer having an inherent viscosity of 0.1 to 3.0 as determined at 0.1% weight/volume concentration in benzene at 25° C., and, (2) a stabilizing quantity within the range of from about 0.0001% to 0.05% by weight of said fuel of a demulsifier consisting essentially of an N-(diloweralkylaminoalkyl) hydrocarbon sulfonamide produced on reaction of a chlorosulfonated petroleum hydrocarbon wax with a diloweralkylaminoalkylamine in which the tertiary and primary amine groups are separated by at least 2 carbon atoms.

3. A distillate hydrocarbon fuel taken from the group consisting of fuel oils and jet fuels containing (1) as a sludge inhibiting and dispersing agent from about 0.001 to 0.1% by weight of said fuel of an oil-soluble, basic amino nitrogen-containing addition type copolymer containing in combined form as its essential monomeric components copolymerizable ethylenically unsaturated compounds, one of which is from the group consisting of acrylic and alkacrylic esters of aliphatic alcohols of from 8 to about 18 carbon atoms and one of the components is beta-diethylaminoethyl methacrylate, said copolymer containing 0.1% to 3.5% by weight of basic amino nitrogen and said polymer having an inherent viscosity of 0.1 to 3.0 as determined at 0.1% weight/volume concentration in benzene at 25° C., and, (2) a stabilizing quantity within the range of from about 0.0001% to 0.05% by weight of a demulsifier consisting essentially of an N-(diloweralkylaminoalkyl) hydrocarbon sulfonamide produced on reaction of a chlorosulfonated petroleum hydrocarbon wax with a diloweralkylaminoalkylamine in which the tertiary and primary amine groups are separated by at least 2 carbon atoms.

4. A distillate hydrocarbon fuel taken from the group consisting of fuel oils and jet fuels containing (1) as a sludge inhibiting and dispersing agent from about 0.001 to 0.1% by weight of an oil-soluble, basic amino nitrogen-containing addition type tripolymer of a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1 to 3.5% by weight of basic amino nitrogen and said tripolymer having an inherent viscosity of 0.1 to 3.0 as determined at 0.1% weight/volume concentration in benzene at 25° C., and, (2) a stabilizing quantity within the range of from about 0.0001% to 0.05% by weight of said fuel of the reaction product of a chlorosulfonated petroleum hydrocarbon wax and 2-dimethylaminoethylamine.

5. A distillate hydrocarbon fuel taken from the group consisting of fuel oils and jet fuels containing (1) as a sludge inhibiting and dispersing agent from about 0.001 to 0.1% by weight of an oil-soluble, basic amino nitrogen-containing addition type tripolymer of a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1 to 3.5% by weight of basic amino nitrogen and said tripolymer having an inherent viscosity of 0.1 to 3.0 as determined at 0.1% weight/volume concentration in benzene at 25° C., and, (2) a stabilizing quantity within the range of from about 0.0001% to 0.05% by weight of said fuel of the reaction product of a chlorosulfonated petroleum hydrocarbon wax and 3-dimethylaminopropylamine.

6. An additive for distillate hydrocarbon fuels taken from the group consisting of fuel oils and jet fuels, said additive comprising a liquid hydrocarbon carrier, said carrier containing up to about 50% by weight of (1) an oil-soluble basic amino nitrogen-containing addition type copolymer containing in combined form as its essential monomeric components copolymerizable ethylenically unsaturated compounds each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., and, (2) up to about 10% by weight of said fuel of a demulsifier consisting essentially of an N-(diloweralkylaminoalkyl) hydrocarbon sulfonamide produced on reaction of a chlorosulfonated petroleum hydrocarbon wax with a diloweralkylaminoalkylamine in which the tertiary and primary amine groups are separated by at least 2 carbon atoms, the ratio of said copolymer to demulsifier being within the range of about 5:1 to 10:1.

References Cited in the file of this patent
UNITED STATES PATENTS

| | | |
|---|---|---|
| 2,197,800 | Henke | Apr. 23, 1940 |
| 2,197,851 | Dietrich | Apr. 23, 1940 |
| 2,361,188 | Fox | Oct. 24, 1944 |
| 2,805,925 | Biswell | Sept. 10, 1957 |